Oct. 18, 1932.    E. C. BALLMAN    1,882,733
SINGLE PHASE CONDENSER MOTOR
Filed March 5, 1930
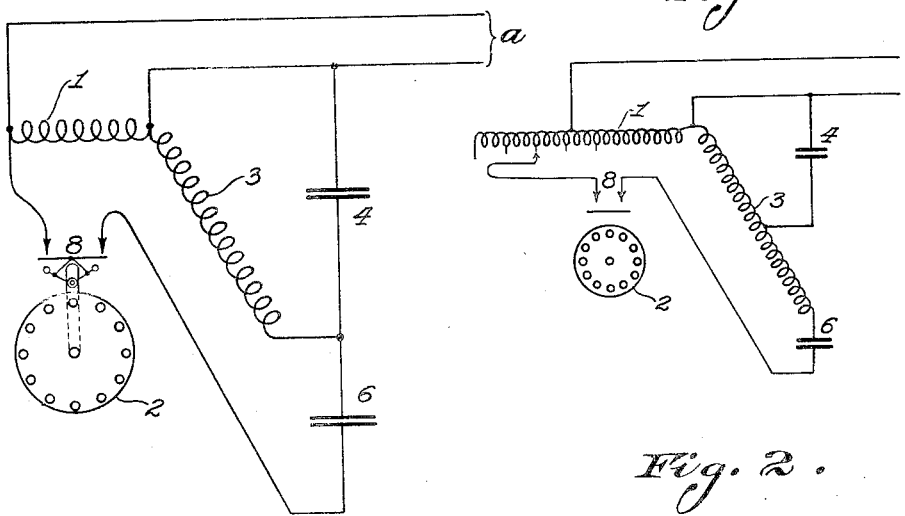
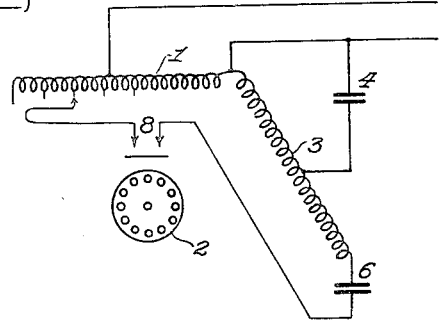
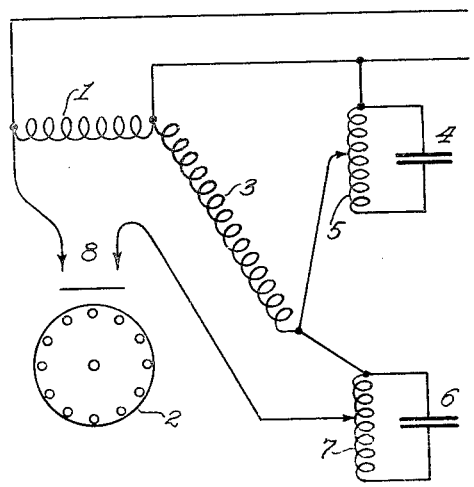
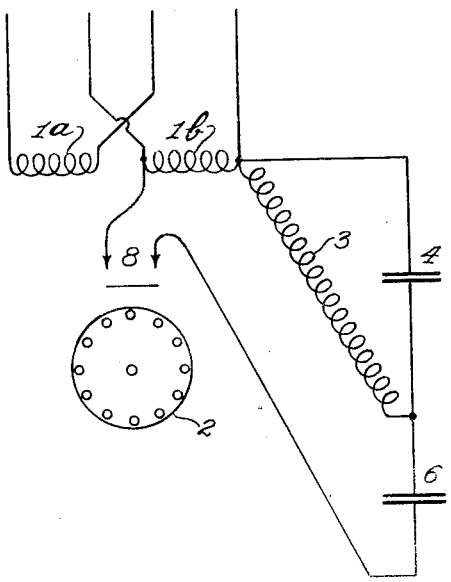
Inventor:
EDWIN C. BALLMAN,
His Attorney.

Patented Oct. 18, 1932

1,882,733

UNITED STATES PATENT OFFICE

EDWIN C. BALLMAN, OF ST. LOUIS, MISSOURI

SINGLE PHASE CONDENSER MOTOR

Application filed March 5, 1930. Serial No. 433,226.

This invention pertains to electric motors and more particularly to that type of single phase alternating current motor known as condenser motors.

In previous efforts to improve the performance of a single phase motor, it has been proposed to make use of a condenser connected so as to receive its energy from an auxiliary winding of the motor. A number of modifications of this type of connection have been used with various degrees of success.

A great difficulty with this type of motor, however, has been encountered in attempting to properly design the condenser.

In such a motor it is not difficult to so proportion the voltage and capacity of the condenser so as to give fairly good running performance. The conditions encountered during the starting period, however, are widely different from those obtained when the motor is up to its normal running speed. Accordingly, such a condenser will have little or no effect beneficial to the starting action of the motor.

One of the objects of this invention, therefore, is to provide a motor of the condenser type which will have good performance both in running and starting.

Another object of this invention is to provide such an arrangement of windings and condensers that the motor will have a high starting torque together with a good starting current and will at the same time have a good running performance.

Another object is to provide a motor which, while having the above advantages, will be readily adaptable to the usual commercial conditions of operation.

Further objects will appear from the following description taken in connection with the accompanying drawing, in which:

Figure 1 is a diagram representing the circuits of a single phase motor embodying this invention;

Figure 2 is a similar diagram illustrating the use of a transformer for adjusting the condenser voltage;

Figure 3 is a similar diagram illustrating the application of the invention to a double voltage motor; and Figure 4 is a similar diagram illustrating the method of adjusting the condenser voltages by adjusting the motor windings.

Referring now to the drawing, 1 designates the main primary winding of a single phase induction motor having a rotor 2 of any suitable type, usually a squirrel cage. An auxiliary primary winding 3 is wound at an angle to the main winding. The winding 3 should be so related to the winding 1 that the magnetic field set up by the winding 1 will act upon the winding 3 to induce a voltage therein. A difference of 60 electrical degrees gives a good performance.

Connected in the circuit of the winding 3 is a condenser 4 which will in this specification be called the "running" condenser since it remains in the circuit during the normal running operation of the motor. The voltage which is impressed on the condenser 4 is derived entirely from the auxiliary winding 3. By a voltage which is "derived" from the winding 3 as used in this specification and the appended claims is meant a voltage which depends directly upon that induced in the winding 3 by the field of the winding 1. This may be the induced voltage itself as where the condenser is connected directly across the winding 3 as shown in Figures 1 and 3. Or it may be a voltage obtained directly by transformer action from such induced voltage as in the embodiment of Figure 2. Or it may be a fraction of such induced voltage obtained by taking off a tap from the winding 3 as in the embodiment of Figure 4.

With condenser 4 so connected, the voltage applied thereto may be adjusted to any required value by properly designing the winding 3. In case a higher voltage is required than may conveniently be obtained from the winding 3 itself, a transformer 5 may be used to step up the condenser voltage as illustrated in Figure 2.

In order to improve the starting performance of the motor a second condenser 6 is provided. This condenser will for the sake of convenience be called the "starting" condenser. This condenser has impressed upon it a voltage derived from the sum of the voltages of the windings 1 and 3. This voltage may be taken directly from the windings themselves as shown in Figure 1. Or this voltage may be stepped up by means of a transformer 7 as in Figure 2. Or this voltage may be stepped up by adding extra turns to either one or both of the windings 1 and 3. Figure 4 illustrates the connection in which both windings 1 and 3 have extra turns. Either one of these windings may, however, be used with a normal number of turns as in the embodiment of Figure 1 while the other may have extra turns. Of course, in case a lower voltage is desired than the sum of the voltages of windings 1 and 3, a tap may be taken off from either winding in such a manner as indicated in dotted lines in Figure 4.

With this connection, the condenser 6 may be designed so as to have the most advantageous values of capacity and dielectric strength. This is an important consideration since the size and cost of such a condenser depends upon these two features. By increasing the voltage, the bulk of the condenser may be reduced. Furthermore, since this condenser is in circuit for only a comparatively short time during the starting period, its dielectric strength need not be as great as if it were in circuit continuously.

A switch 8 is provided to open the circuit of the condenser 6 when the motor has obtained its normal running speed. This switch may be of centrifugal type adapted to open automatically before the motor obtains its full speed.

In the operation of this motor the same may be connected to a supply line $a$ through a suitable starting switch, not shown in the drawing. When the motor is starting up, the switch 8 is closed. Accordingly, a current will flow through the condenser 6 and this current may be adjusted by proper design of the condenser and its impressed voltage so as to give a good starting performance. The condenser 4 is also in circuit at this time but the voltage induced in the winding 3 at starting is comparatively low. Accordingly, the currents traversing the condenser 4 will not influence the starting performance of the motor to as great an extent as will the currents traversing the condenser 6. As the motor speed increases the voltage induced in the winding 3 increases and accordingly, the current in the condenser 4 increases to a corresponding extent. At the same time the voltage impressed upon the condenser 6 is increased and corresponding increased current flows in its circuit. As this increase of current with both condenser circuits active, may go beyond the point of best running performance, the switch 8 is adjusted to open at an appropriate speed so as to cut off the current in the condenser 6. This leaves the condenser 4 in control of the current in the winding 3 during full speed operation.

Figure 3 illustrates an arrangement in which the winding 1 is divided into two halves, 1a and 1b which may be connected in series or parallel so as to be adapted to either of two standard line voltages in a manner well known in the motor art. In this case the transformer 6 is connected so as to include only one of these halves. Accordingly, the conditions in the circuit of condenser 6 will be the same at whatever voltage the motor is operating.

It will be seen, therefore, that this invention provides an arrangement whereby a condenser motor of this type may be designed for good performance under both starting and running conditions. Furthermore, by providing separate condensers and condenser circuits in the manner described one circuit and its condenser may be designed to fit the running conditions and the other to fit the starting conditions. In this way both condensers may be adjusted not only for best performance, but for the best economy in their construction. Accordingly, the condenser 4 which is permanently in circuit with winding 3 must have a high factor of safety in its dielectric strength. As the cost per K. V. A. of a condenser decreases as the voltage increases then it is desirable to make the voltage of winding 3 as high as it is practical to obtain commercial condensers of high factor of dielectric safety. In order to get the maximum starting torque the condenser 6 should allow as large a capacity current to flow as is practical. This requires that the condenser 6 be high in microfarad capacity and that the voltage across it be as high as possible. With the scheme as described in this invention the voltage impressed across condenser 6 is as large as possible without resorting to a step-up transformer. As a condenser will stand a much greater voltage for a short time than it will stand continuously and as condenser 6 is only used for starting, it is possible with this scheme to make condenser 6 with a relatively low dielectric strength which gives it a high microfarad capacity at a relatively low cost. Thus both condensers 4 and 6 are used under conditions which permit maximum economy in their design without interfering with their adjustment for best performance of the motor.

It will be understood, of course, that the sectional main winding of Figure 3 may be used with the circuit arrangements of Figures 2 and 4, and also that one of the arrangements of Figures 2 and 4 may be used for either condenser circuit, and the other for the other.

It is obvious that various changes may be made in details, within the scope of the appended claims, without departing from the spirit of this invention. It is, therefore, to be understood that this invention is not to be limited to the specific details shown and/or described.

Having thus described the invention what is claimed is:

1. In a single-phase alternating-current motor having a stator and a rotor, a main primary winding adapted for connection to a supply line, an auxiliary primary winding wound so as to have a voltage induced therein by the field set up by said main winding, a running condenser connected so as to have impressed thereon a voltage derived from that induced in said auxiliary winding, and a starting condenser connected so as to have impressed thereon a voltage derived from the vector sum of the voltages of said main and auxiliary windings.

2. In a single-phase alternating-current motor having a stator and a rotor, a main primary winding adapted for connection to a supply line, an auxiliary primary winding wound so as to have a voltage induced therein by the field set up by said main winding, a running condenser bridged across said auxiliary winding, and a starting condenser bridged across said main and auxiliary windings.

3. In a single-phase alternating-current motor having a stator and a rotor, a main primary winding adapted for connection to a supply line, an auxiliary primary winding wound so as to have a voltage induced therein by the field set up by said main winding, a running condenser connected so as to have impressed thereon a voltage derived from that induced in said auxiliary winding, a starting condenser connected so as to have impressed thereon a voltage derived from the vector sum of the voltages of said main and auxiliary windings, and means for disconnecting said starting condenser at running speed of the motor.

4. In a single-phase alternating-current motor having a stator and a rotor, a main primary winding adapted for connection to a supply line, an auxiliary primary winding wound so as to have a voltage induced therein by the field set up by said main winding, a running condenser bridged across said auxiliary winding, a starting condenser bridged across said main and auxiliary windings, and means for disconnecting said starting condenser at running speed of the motor.

5. In a single-phase alternating-current motor having a stator and a rotor, a main primary winding adapted for connection to a supply line, an auxiliary primary winding wound so as to have a voltage induced therein by the field set up by said main winding, a running condenser connected so as to have impressed thereon a voltage derived from that induced in said auxiliary winding, a starting condenser connected so as to have impressed thereon a voltage derived from the vector sum of the voltages of said main and auxiliary windings, and a centrifugal switch adapted to disconnect said starting condenser at a predetermined rotor speed.

6. In a single-phase alternating-current motor having a stator and a rotor, a main primary winding adapted for connection to a supply line, an auxiliary primary winding wound so as to have a voltage induced therein by the field set up by said main winding, a running condenser bridged across said said auxiliary winding, a starting condenser bridged across said main and auxiliary windings, and a centrifugal switch adapted to disconnect said starting condenser at a predetermined rotor speed.

7. In a single-phase alternating-current motor having a stator and a rotor, a main primary winding adapted for connection to a supply line, an auxiliary primary winding wound so as to have a voltage induced therein by the field set up by said main winding, a running condenser connected so as to have impressed thereon a voltage derived from that induced in said auxiliary winding, a starting condenser connected so as to have impressed thereon a voltage derived from the vector sum of the voltages of said main and auxiliar windings, and means for adjusting one of said voltages.

8. In a single-phase alternating-current motor having a stator and a rotor, a main primary winding having sections adapted for series or parallel connection to a supply line, an auxiliary primary winding wound so as to have a voltage induced therein by the field set up by said main winding, a running condenser connected so as to have impressed thereon a voltage derived from that induced in said auxiliary winding, a starting condenser connected so as to have impressed thereon a voltage derived from the vector sum of the voltages of said auxiliary winding and a section of said main winding.

9. In a single-phase alternating-current motor having a stator and a rotor, a main primary winding having sections adapted for series or parallel connection to a supply line, an auxiliary primary winding wound so as to have a voltage induced therein by the field set up by said main winding, a running condenser bridged across said auxiliary winding, and a starting condenser bridged across said auxiliary winding and a section of said main winding.

In testimony whereof, I affix my signature this 22nd day of January, 1930.

EDWIN C. BALLMAN.